United States Patent [19]

Eberhard et al.

[11] Patent Number: 4,830,346
[45] Date of Patent: May 16, 1989

[54] HYDRAULICALLY DAMPED ELASTIC MOUNTING

[75] Inventors: Günter Eberhard, Gehrden; Jürgen Heitzig, Hanover, both of Fed. Rep. of Germany

[73] Assignee: Continental Aktiengesellschaft, Hanover, Fed. Rep. of Germany

[21] Appl. No.: 125,593

[22] Filed: Nov. 25, 1987

[30] Foreign Application Priority Data

Nov. 26, 1986 [DE] Fed. Rep. of Germany ....... 3640316

[51] Int. Cl.$^4$ .................... F16F 15/04; F16M 13/00; F02F 11/00
[52] U.S. Cl. ............................... 267/140.1; 248/562; 267/219; 277/53
[58] Field of Search ................. 267/35, 113, 136, 124, 267/126, 127, 129, 219, 140.1, 220; 188/322.18, 322.22, 322.5, 268, 298; 248/562, 636, 638, 565; 123/192 R, 195 A; 180/300, 312; 277/53–57, 73, 135; 92/181 P, 183, 172

[56] References Cited

U.S. PATENT DOCUMENTS

| | | | |
|---|---|---|---|
| 3,368,807 | 2/1968 | Thrasher | 188/268 X |
| 4,002,244 | 1/1977 | Matsumoto et al. | 267/64.11 X |
| 4,406,463 | 9/1983 | Fabrowsky | 277/53 |
| 4,572,490 | 2/1986 | Alciati | 267/35 X |
| 4,610,438 | 9/1986 | Eberhard et al. | 188/298 X |
| 4,720,087 | 1/1988 | Duclds et al. | 267/140.1 |

Primary Examiner—Andres Kashnikow
Assistant Examiner—Robert J. Oberleitner
Attorney, Agent, or Firm—Becker & Becker, Inc.

[57] ABSTRACT

A hydraulically damped elastic mounting, especially for the engines of motor vehicles. To achieve, with a straightforward and economical construction, an effective, purely hydraulic damping of long-stroke, low-frequency vibrations, and a complete absorption of acoustic, i.e. short-stroke, high-frequency vibrations, a working cylinder is filled with a low-viscosity hydraulic fluid, and a damping disk mounted on the connecting rod nearly completely spans the cross-sectional area of the working cylinder. Provided all the way around on the periphery of a damping disk is a profiled shape that seals, in a substantially contact-free manner, the annular gap between the damping disk and the inner wall of the working cylinder. The damping disk divides the working cylinder into two partial chambers that communicate with one another via at least one calibrated transfer passage.

20 Claims, 3 Drawing Sheets

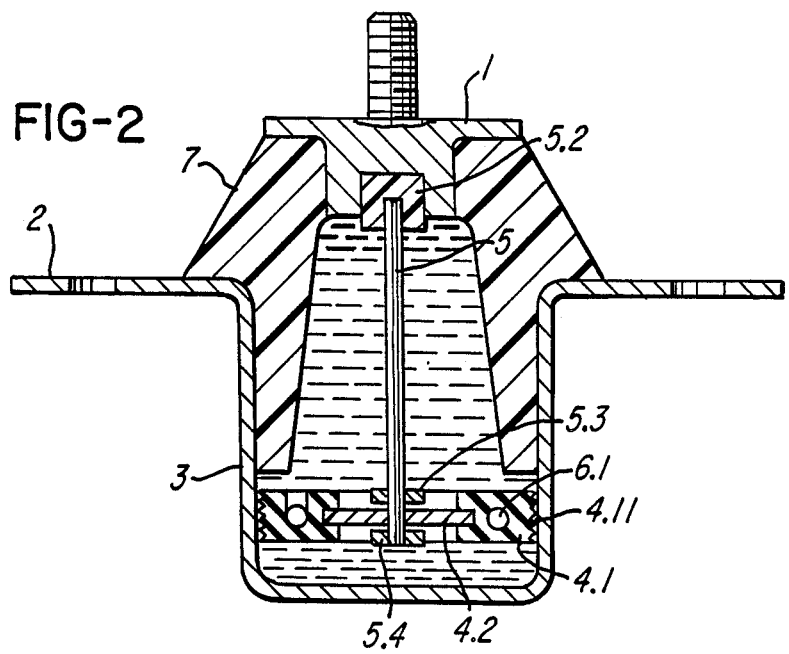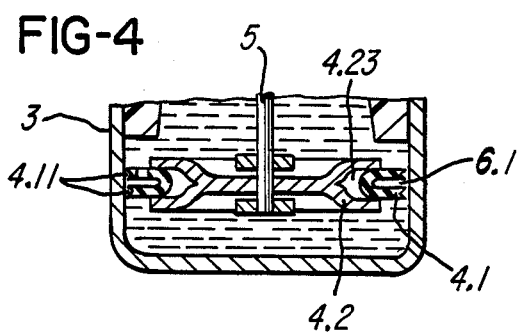

HYDRAULICALLY DAMPED ELASTIC MOUNTING

BACKGROUND OF THE INVENTION

The present invention relates to a hydraulically damped resilient or elastic mounting, especially for the engines of motor vehicles. The mounting includes a first connector that bears against a second connector via an essentially annular elastomeric spring element. A connecting rod is secured to the first connector and extends concentrically into a pot-shaped working cylinder that is securely connected to the second connector and is filled with a flowing or hydraulic medium. A damping disk is mounted with axial play on the free end of the connecting rod. The damping disk is axially movably disposed in the working cylinder in such a way that the damping disk is disposed essentially perpendicular to the axis of the working cylinder, and an annular gap exists between the damping disk and the inner wall of the working cylinder.

Mountings of this general type, which are provided in particular to support the engines of motor vehicles, are known, for example, from U.S. Pat. No. 3,368,807 Thrasher dated Feb. 13, 1968 and U.S. Pat. No. 4,610,438 Eberhard et al dated Sep. 9, 1986 the latter of which belongs to the assignee of the present application. The heretofore known mountings of the aforementioned general type contain as hydraulic medium a liquid having a viscosity that is generally in the order of magnitude of 100,000 cp (centipoise). The damping effect of these heretofore known mountings is derived by having a disk, which is disposed perpendicular to the direction of deflection, carry out displacement operations in the high-viscosity hydraulic medium. The known mountings will therefore be designated as displacement mountings in the following discussion. Just like the so-called hydraulic mountings, which operate pursuant to a basically different principle, and are known, for example, from U.S. Pat. No. 4,159,091 LeSalver et al dated June 26, 1979, the displacement mountings are intended on the one hand for absorbing the so-called acoustic, i.e. high-frequency, motor vibrations, so that the latter are not transmitted to the rest of the vehicle, and on the other hand for rapidly suppressing low-frequency vibrations by intense damping.

Although the aforementioned so-called displacement mountings are distinguished by a straightforward and economical type of construction, and also permit a tension stop to be integrated therein in a simple manner, these known displacement mountings have the drawback that the absorption of the acoustic vibrations was limited due to the fact that the shearing stresses from the engine were introduced into the high-viscosity hydraulic medium, and were transmitted via this medium to the body of the vehicle.

It is therefore an object of the present invention to provide an elastic mounting that has the advantages of the heretofore known so-called displacement mountings, and at the same time permits not only a practically complete absorption of the so-called acoustic low-frequency, longstroke vibrations, but also an effective damping of these vibrations.

BRIEF DESCRIPTION OF THE DRAWINGS

This object, and other objects and advantages of the present invention, will appear more clearly from the following specification in conjunction with the accompanying schematic drawings, in which:

FIGS. 1 and 2 are cross-sectional views of two exemplary embodiments of the inventive mounting;

FIGS. 3 and 4 are partial cross-sectional views showing part of the working cylinder and different exemplary inventive embodiments of the damping disk.

SUMMARY OF THE INVENTION

Figure 1:
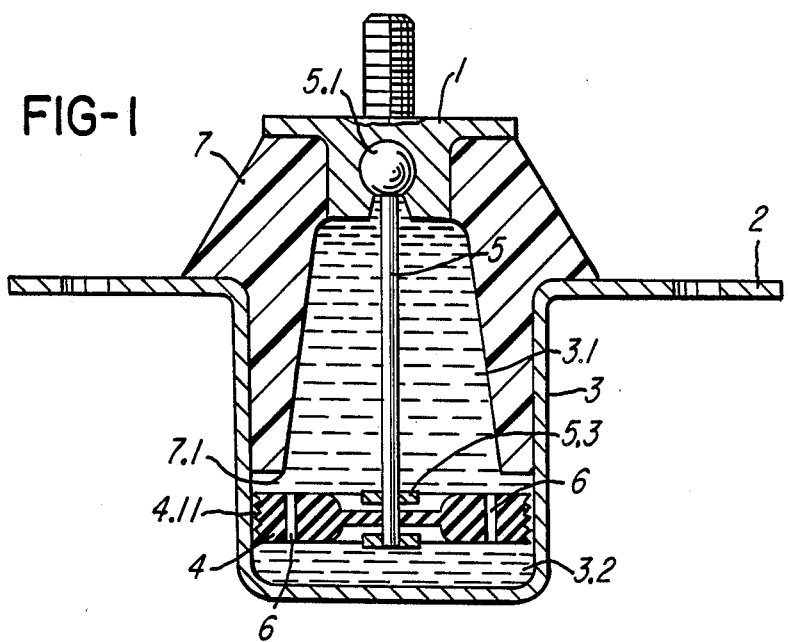

The elastic mounting of the present invention is characterized primarily in that: the working cylinder is filled with a low-viscosity hydraulic fluid; the damping disk nearly completely spans the cross-sectional area of the working cylinder; the damping disk has a periphery on which is provided, all the way around, a profiled shape that seals, in a substantially contact-free manner, the annular gap between the damping disk and the inner wall of the working cylinder; and the damping disk divides the working cylinder into two partial chambers that communicate with one another via at least one calibrated transfer passage that is provided in the damping disk and opens into each of the partial chambers.

Similar to the so-called displacement mounting discussed previously, the inventive elastic mounting has a damping disk that is connected to one of the connectors via a connecting rod, and is axially movable in a working cylinder that is filled with hydraulic medium. However, in other respects the inventive elastic mounting differs from the heretofore known mounting by a fundamentally different construction and operating principle.

In contrast to the heretofore known so-called displacement mountings, the working cylinder of the inventive mounting is not filled with a high-viscosity hydraulic medium, but rather with a low-viscosity hydraulic medium, and the damping disk is not disposed at a greater distance from the wall of the working cylinder, but rather nearly completely spans the cross-sectional area of the working cylinder, with the periphery of the damping disk being provided all the way around with a profiled shape that seals the annular gap between the damping disk and the inner wall of the working cylinder in a substantially contact-free manner. This profiled shape of the periphery of the damping disk thus essentially prevents transfer of hydraulic medium through the annular gap, without however thereby impairing the axial movability of the damping disk by static friction. Such a contact-free sealing can be realized by circumferential sealing lips, and is preferably embodied as a circumferential sealing labyrinth comprised of a plurality of such sealing lips.

Whereas the viscosity of the hydraulic medium of the heretofore known so-called displacement mountings was 100,000 cp and more, the viscosity of the hydraulic fluid of the inventive mountings is less than 10,000 cp. As a matter of fact, this value is preferably less than 200 cp, which can be obtained, for example, with mixtures of glycol (such as ethylene glycol) and water, since it has been shown that in so doing the best conditions are provided for the desired absorption of high-frequency vibrations. This is true because due to the low internal friction of such low-viscosity hydraulic fluids, acoustic vibrations remain practically undamped, these vibrations being introduced in particular from a running engine into the mounting, and having amplitudes that, as known, are only fractions of a millimeter, so that due to the axial play with which the damping disk is mounted on the connecting rod, these vibrations cannot effect axial displacements of the damping disk.

In contrast, the low-frequency deflections, which occur with greater amplitudes, experience a significant damping, since as soon as the mounting deflects inwardly or outwardly, the axial displacement of the connecting rod, which is connected to one of the mounting connectors, exceeds the axial play of the damping disk mounting, and the damping disk comes to rest against one of the stops that limits its free axial play, the damping disk is axially shifted, accompanied by the displacement of hydraulic fluid from one partial chamber of the working cylinder into the other partial chamber. Since due to the inventive sealing configuration provided at the annular gap between the damping disk and the wall of the working cylinder, the aforementioned displacement of hydraulic fluid cannot take place via this annular gap. Thus, hydraulic fluid can be transferred between the two partial chambers of the working cylinder only by the calibrated transfer passage means or passages that continuously interconnect these partial chambers. Essentially as a function of its length, cross-sectional shape, diameter, and spatial orientation, the transfer passage means or passages throttle the flow of hydraulic fluid and hence effect a corresponding damping of the longstroke deflection that causes this flow of hydraulic fluid.

Each transfer passage is preferably embodied as a channel that extends through the damping disk. With regard to the channel length that can be realized, it is expedient to form this channel in the damping disk in the form of a so-called annular channel, i.e. approximately in the form of a single or multiple circular helix. Pursuant to one particularly advantageous embodiment of this type, the damping disk comprises an inner part that is mounted to the free end of the connecting rod, as well as an outer part in which an annular channel is formed; a circumferential sealing labyrinth is formed on the periphery of this outer part.

Pursuant to further inventive embodiments, which can be advantageous for certain applications, the transfer passage or passages can be formed in the connecting rod, can extend within the wall of the working cylinder, or can be embodied as a groove that is formed in the wall of the working cylinder, is open toward the interior of the latter, and establishes the cross-sectional throttle area in cooperation with the opposite peripheral area of the damping disk.

Since the forces that in practice act upon an elastic mounting, such as a motor mount, do not occur only in the direction of the longitudinal axis of the mounting, but frequently also at angles thereto, the connection of the damping disk via the connecting rod to the pertaining connector of the mounting is preferably not entirely rigid, but rather is flexible and/or is established via a joint. Pursuant to preferred embodiments of the present invention, the connecting rod can be mounted on the pertaining connector via a ball-and-socket joint or by an elastic connecting piece; it would also be possible to have the connecting piece itself elastically bendable in the direction transverse to its longitudinal axis.

Pursuant to a further improvement of the inventive mounting, which optimizes its satisfactory operation under most operating conditions encountered in practice, at least the outer part on the damping disk, which on its periphery, all the way around, is provided with the profiled configuration that seals the annular gap between the damping disk and the inner wall of the working cylinder in a contact-free manner, is radially movable relative to the connecting rod in a manner free of static friction. This embodiment prevents radial forces from being transferred from the connecting rod to the edge of the damping disk, thus assuring that even when the free end of the connecting rod, on which the damping disk is mounted, is deflected radially, the precise centering of the outer part of the damping disk relative to the working cylinder, and hence the sealing of the annular gap in a contact-free manner, i.e. in a manner free of static friction, all the way around, are maintained. This means that the axial movability of the damping disk in a manner free of static friction, which is important for the optimum damping function of the mounting, cannot be disrupted by having the outer edge of the damping disk pressed radially outwardly on one side against the wall of the working cylinder to form static friction forces at that location.

Pursuant to another preferred embodiment of the present invention, the aforementioned optimum situation is realized by providing the inner part of the damping disk, which inner part is mounted on the free end of the connecting rod, with a central opening having a diameter that is greater, preferably by at least 20%, than the diameter of the connecting rod that extends therethrough. Both sides of this opening are loosely covered by sealing disks that are centrally mounted on the connecting rod. These sealing disks do not adversely affect the practically static-frictionfree mounting of the damping disk, this being true both for the axial free play of the damping disk that is important for the absorption of acoustic vibrations, as well as in regard to the radial play of the damping disk, with, as previously mentioned, the satisfactory damping of long-stroke, low-frequency vibrations possibly being dependent on this radial play when the displacement of the connecting rod is not quite concentric.

Pursuant to another specific embodiment of the present invention, the outer edge of the damping disk receives an appropriate radial movability relative to the free end of the connecting rod by providing the damping disk with an inner part that is mounted on the connecting rod to have only axial free play, and an outer part that is mounted with radial play on the inner part. This radial play is preferably realized structurally by a circumferential, U-shaped groove that is disposed on the periphery of the inner part, and is open in the radial direction, with the annular outer part being disposed in this groove in a manner free of static friction. Also within the framework of the present invention is the kinematic reversal of these variants, in other words, providing an appropriate groove on the inner edge of the outer part, with this groove extending about the outer edge of the inner part.

Pursuant to another advantageous embodiment of the damping disk, the latter can comprise an inner part that is essentially rigid and nondeformable and is centrally mounted with axial play between two stops on the free end of the connecting rod, with the damping disk also comprising an outer part made of flexible material, with an annular or helical transfer passage being formed in the outer part, with the periphery of the latter being provided with circumferential sealing lips. In particular, this transfer passage can be in the form of an annular or helical, circumferential groove that is formed in the outermost edge of the damping disk and is open toward the radially outer side.

The inventive mounting is preferably provided with a so-called tension stop that, in the direction of load relaxation limits the deflection of that connector that is connected to the damping disk via the connecting rod. For this purpose, between this connector and the damping disk, the working cylinder is provided with a stop for the damping disk, with this stop bearing against the connector. The stop is advantageously formed by a radially inwardly projecting edge of the elastomeric spring element of the mounting.

Further specific features of the present invention will be discussed in detail subsequently.

DESCRIPTION OF PREFERRED EMBODIMENTS

Referring now to the drawings in detail, as shown in FIG. 1, the inventive mounting is provided with connectors 1 and 2, via which the mounting, for example, can be bolted to the engine of a motor vehicle on the one hand, and to the chassis of the vehicle on the other hand. The connectors 1 and 2 bear against one another via an essentially annular elastomeric spring element 7. In the illustrated embodiment, the connecting rod 5 is mounted on the first connector 1 via a ball-and-socket joint 5.1. The connecting rod 5 extends centrally into the working cylinder 3, which is securely connected to the second connector 2. The free end of the connecting rod 5 carries the damping disk 4 with axial play - the so-called free play—that is limited by the two stops 5.3 and 5.4. The damping disk 4 divides the working cylinder 3, which is filled with a low-viscosity flowing or hydraulic medium, into two partial chambers 3.1 and 3.2 that are continuously interconnected via at least one calibrated transfer passage 6. The periphery of the damping disk 4 has a profiled shape 4.11 that forms a so-called contact-free sealing of the annular gap between the damping disk 4 and the air wall of the working cylinder 3, thus permitting an axial shifting of the damping disk 4 in the working cylinder 3, with this axial shifting being free of static friction.

As long as only high-frequency, short-stroke vibrations are introduced into the mounting via the connector 1, with the overall amplitudes of these vibrations not exceeding the free play of the damping disk 4 as fixed by the stops 5.3 and 5.4, the damping disk 4 is not affected thereby and remains in its neutral position, which is determined by the static basic load, so that the vibrations are abosrbed in an undamped manner by the elastomeric spring element 7.

However, if long-stroke deflections or vibrations of the connector 1 cause the aforementioned free play to be exceeded, this leads to an axial shifting of the damping disk 4, and hence to a displacement of hydraulic fluid from the partial chamber 3.1 of the working cylinder 3, through the transfer passage 6, into the other partial chamber 3.2, or vice versa. As a result of the throttle effect of the transfer passage or passages 6, the long-stroke deflections experience a more or less pronounced damping that is determined by the geometry of the transfer passage and that, due to the inventive axial displacement of the damping disk in a manner free of static friction, is not tampered with by frictional forces.

That edge 7.1 of the elastomeric spring element 7 that extends into the working cylinder 3, and against which the damping disk 4 comes to rest when a great deal of load is removed from the mounting, forms a so-called tension stop that is structurally straightforward and easy to manufacture, and can be produced in an economical manner.

In the embodiment of the present invention illustrated in FIG. 2, the connecting rod 5 is connected to the connector 1 via an elastic connecting piece 5.2. In this embodiment, the damping disk comprises an essentially nondeformable inner part 4.2 that is centrally mounted between the stops 5.3 and 5.4 on the free end of the connecting rod 5 with axial play; the damping disk furthermore comprises a flexible outer part 4.1 that is secured or mounted to the inner part 4.2. The transfer passage is formed in the outer part 4.1 in the form of a so-called annular channel 6.1. The outer periphery of the outer part 4.1 is provided with a sealing labyrinth 4.11 of circumferential sealing lips.

Figure 3:
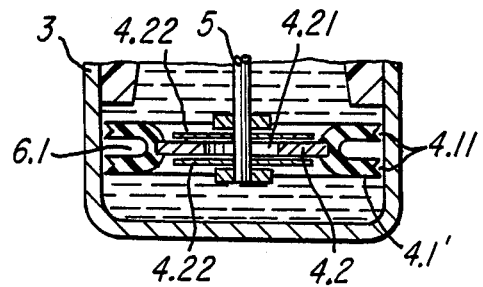

FIG. 3 shows a damping disk with a central opening 4.21 that has a distinctly greater diameter than does the connecting rod 5 that passes through the disk. This opening 4.21 is loosely covered on both sides by sealing disks 4.22 that are centrally mounted on the connecting rod 5. In this way, the damping disk is radially movable relative to the connecting rod 5 in a manner that is practically free of static friction. Small radial deflections on the connecting rod 5 transmit no radial forces to the damping disk.

FIG. 3 also illustrates a particularly advantageous arrangement of the transfer passage, which in this embodiment is integrated into the flexible outer part 4.1 of the damping disk as an annular channel 6.1 that is in the form of a radially outwardly open groove. Also in this embodiment, the circumferential sealing lips 4.11 assure a contact-free seal relative to the inner wall of the working cylinder 3.

In the embodiment of the damping disk illustrated in FIG. 4, the transfer passage is similar to that shown in FIG. 3. However, with this embodiment, the transmission of radial deflection forces from the connecting rod 5 onto the outer part 4.1 of the damping disk 4, which outer part 4.1 supprts the contact-free sealing means 4.11, is avoided by having the outer part 4.1 be radially movably mounted in a circumferential groove 4.23 that is provided on the inner part 4.2.

Figure 5:
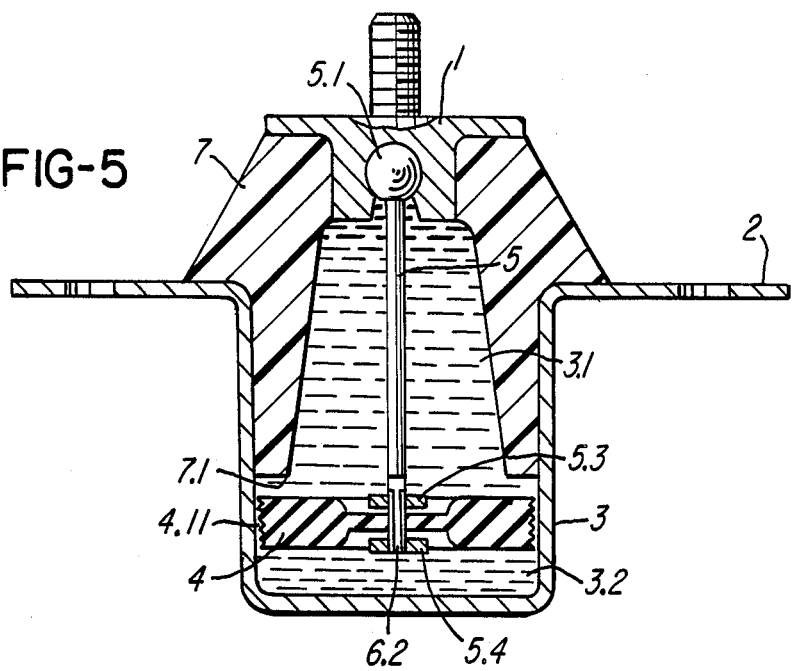
FIGS. 5 and 6 are cross-sectional views of two alternative embodiments of the inventive mounting.
Figure 6:
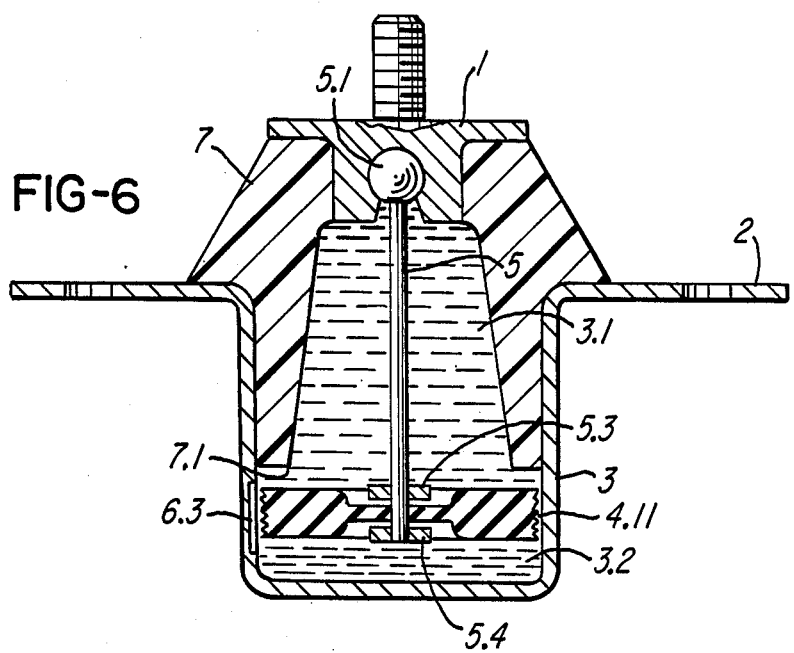

FIG. 5 represents a bearing with an overflow passage 6.2 in the connecting rod 5. FIG. 6 shows an alternative embodiment with the overflow passage configured as a groove 6.3 into the wall of the working chamber. The groove is open to the inner space of working chamber.

The present invention is, of course, in no way restricted to the specific disclosure of the specification and drawings, but also encompasses any modifications within the scope of the appended claims.

What we claim is:

1. In a hydraulically damped elastic mounting that includes a first connector that bears against a second connector via an essentially annular elastomeric spring element, with a connecting rod being secured to said first connector and extending concentrically into a por-shaped working cylinder that is securely connected to said second connector and is filled with a hydraulic medium, and with a damping disk being mounted with axial play on a free end of said connecting rod, said damping disk being axially movably disposed in said working cylinder in such a way that said damping disk is disposed essentially perpendicular to the axis of said working cylinder and an annular gap exists between said damping disk and the inner wall of said working cylinder, the improvement wherein:

said working cylinder is filled with the hydraulic medium which is a low-viscosity hydraulic fluid, and said damping disk nearly completely spans the cross-sectional area of said working cylinder, with said damping disk having a periphery on which is provided, all the way around, a profiled configuration that seals, in a substantially contact-free manner, said annular gap between said damping disk and said inner wall of said working cylinder, and with said damping disk dividing said working cylinder into two partial chambers that communicate with one another via at least one calibrated transfer passage that opens into each of said partial chambers, said transfer passage is formed in the wall of said working cylinder.

2. An elastic mounting according to claim 1, in which said profiled configuration on said periphery of said damping disk is a circumferential sealing labyrinth.

3. An elastic mounting according to claim 1, in which said hydraulic fluid has a viscosity of less that 10,000 cp.

4. An elastic mounting according to claim 3, in which said hydraulic fluid has a viscosity of less than 200 cp.

5. An elastic mounting according to claim 1, in which each of said transfer passages is provided in said damping disk and is in the form of a channel that extends through said damping disk.

6. An elastic mounting according to claim 5, in which said transfer channel is formed in said damping disk and is in the form of an annular channel.

7. An elastic mounting according to claim 6, in which said damping disk comprises an outer part and an inner part, with said annular channel being formed in said outer part, and with said profiled configuration being provided on said outer part in the form of a circumferential sealing labyrinth.

8. An elastic mounting according to claim 7, in which at least said outer part of said damping disk is radially movable relative to said connecting rod in a manner free of static friction.

9. An elastic mounting according to claim 1, in which said working cylinder is provided with a tension stop for said damping disk, with said tension stop being disposed between said damping disk and said first connector, and bearing against the latter.

10. An elastic mounting according to claim 9, in which said elastomeric spring element is provided with a radially inwardly projecting edge that forms said tension stop.

11. An elastic mounting according to claim 1, in which said transfer passage is a groove in said wall of said working cylinder, with said groove being open in the direction toward the interior of said working cylinder.

12. In a hydraulically damped elastic mounting that includes a first connector that bears against a second connector via an essentially annular elastomeric spring element, with a connecting rod being secured to said first connector and extending concentrically into a pot-shaped working cylinder that is securely connected to said second connector and is filled with a hydraulic medium, and with a damping disk being mounted with axial play on a free end of said connecting rod, said damping disk being axially movably disposed in said working cylinder in such a way that said damping disk is disposed essentially perpendicular to the axis of said working cylinder and an annular gap exists between said damping disk and the inner wall of said working cylinder, the improvement wherein:

said working cylinder is filled with the hydraulic medium which is a low-viscosity hydraulic fluid, and said damping disk nearly completely spans the cross-secional area of said working cylinder, with said damping disk having a periphery on which is provided, all the way around, a profiled configuration that seals, in a substantially contact-free manner, said annular gap between said damping disk and said inner wall of said working cylinder, and with said damping disk dividing said working cylinder into two partial chambers that communicate with one another via at least one calibrated transfer passage that opens into each of said partial chambers, each of said transfer passages is provided in said damping disk and is in the form of a channel that extends through said damping disk, said transfer channel is formed in said damping disk and is in the form of an annular channel, said damping disk comprises an outer part and an inner part, with said annular channel being formed in said outer part, and with said profiled configuration being provided on said outer part in the form of a circumferential sealing labyrinth, at least said outer part of said damping disk is radially movable relative to said connecting rod in a manner free of static friction, said inner part of said damping disk is provided with a central opening that has a diameter which is at least 20% greater than the diameter of said connecting rod, which extends through said central opening, with both sides of said central opening, i.e. on both sides of said inner part, being loosely covered by sealing disks that are centrally mounted on said connecting rod.

13. In a hydraulically damped elastic mounting that includes a first connector that bears against a second connector via an essentially annular elastomeric spring element, with a connecting rod being secured to said first connector and extending concentrically into a pot-shaped working cylinder that is securely connected to said second connector and is filled with a hydraulic medium, and with a damping disk being mounted with axial play on a free end of said connecting rod, said damping disk being axially movably disposed in said working cylinder in such a way that said damping disk is disposed essentially perpendicular to the axis of said working cylinder and an annular gap exists between said damping disk and the inner wall of said working cylinder, the improvement wherein:

said working cylinder is filled with the hydraulic medium which is a low-viscosity hydraulic fluid, and said damping disk nearly completely spans the cross-sectional area of said working cylinder, with said damping disk having a periphery on which is provided, all the way around, a profiled configuration that seals, in a substantially contact-free manner, said annular gap between said damping disk and said inner wall of said working cylinder, and with said damping disk dividing said working cylinder into two partial chambers that communicate with one another via at least one calibrated transfer passage that opens into each of said partial chambers, each of said transfer passages is provided in said damping disk and is in the form of a channel that extends through said damping disk, said transfer channel is formed in said damping disk and is in the form of an annular channel, said damping disk comprises an outer part and an inner part, with said annular channel being formed in said outer part, and with said profiled configuration being provided on said outer part in the form of a circumferential sealing labyrinth, at least said outer part of said damping disk is radially movable relative to said connecting rod in a manner free of static friction, said outer part of said damping disk is disposed with radial play on said inner part.

14. An elastic mounting according to claim 13, in which said inner part of said damping disk has a periphery on which is provided a circumferential, essentially U-shaped groove that is open in a radially outward direction, with said outer part, in the form of an annular member, being disposed with radial play; and in a manner free of static friction, in said groove.

15. In a hydraulically damped elastic mounting that includes a first connector that bears against a second connector via an essentially annular elastomeric spring element, with a connecting rod being secured to said first connector and extending concentrically into a pot-shaped working cylinder that is securely connected to said second connector and is filled with a hydraulic medium, and with a damping disk being mounted with axial play on a free end of said connecting rod, said damping disk being axially movably disposed in said working cylinder in such a way that said damping disk is disposed essentially perpendicular to the axis of said working cylinder and an annular gap exists between said damping disk and the inner wall of said working cylinder, the improvement wherein:

said working cylinder is filled with the hydraulic medium which is a low-viscosity hydraulic fluid, and said damping disk nearly completely spans the cross-sectional area of said working cylinder, with said damping disk having a periphery on which is provided, all the way around, a profiled configuration that seals, in a substantially contact-free manner, said annular gap between said damping disk and said inner wall of said working cylinder, and with said damping disk dividing said working cylinder into two partial chambers that communicate with one another via at least one calibrated transfer passage that opens into each of said partial chambers, each of said transfer pasages is provided in said damping disk and is in the form of a channel that extends through said damping disk, said damping disk comprises an essentially nondeformable inner part, which is centrally mounted, with axial play, on the free end of said connecting rod between stops that are also mounted on said connecting rod, and also comprises an annular, flexible outer part in which is formed said transfer channel that is in the form of an annular or helical channel, with said profiled configuration being provided on the periphery of said outer part in the form of circumferential sealing lips.

16. An elastic mounting according to claim 15, in which said transfer channel is in the form of a radially outwardly open helical groove formed in the outermost edge of said outer part of said damping disk.

17. In a hydraulically damped elastic mounting that includes a first connector that bears against a second connector via an essentially annular elastomeric spring element, with a connecting rod being secured to said first connector and extending concentrically into a pot-shaped working cylinder that is securely connected to said second connector and is filled with a hydraulic medium, and with a damping disk being mounted with axial play on a free end of said connecting rod, said damping disk being axially movably disposed in said working cylinder in such a way that said damping disk is disposed essentially perpendicular to the axis of said working cylinder and an annular gap exists between said damping disk and the inner wall of said working cylinder, the improvement wherein:

said working cylinder is filled with the hydraulic medium which is a low-viscosity hydraulic fluid, and said damping disk nearly completely spans the cross-sectional area of said working cylinder, with said damping disk having a periphery on which is provided, all the way around, a profiled configuration that seals, in a substantially contact-free manner, said annular gap between said damping disk and said inner wall of said working cylinder, and with said damping disk dividing said working cylinder into two partial chambers that communicate with one another via at least one calibrated transfer passage that opens into each of said partial chambers, said connecting rod is connected to said first connector via a ball-and-socket joint.

18. In a hydraulically damped elastic mounting that includes a first connector that bears against a second connector via an essentially annular elastomeric spring element, with a connecting rod being secured to said first connector and extending concentrically into a pot-shaped working cylinder that is securely connected to said second connector and is filled with a hydraulic medium, and with a damping disk being mounted with axial play on a free end of said connecting rod, said damping disk being axially movably disposed in said working cylinder in such a way that said damping disk is disposed essentially perpendicular to the axis of said working cylinder and an annular gap exists between said damping disk and the inner wall of said working cylinder, the improvement wherein:

said working cylinder is filled with the hydraulic medium which is a low-viscosity hydraulic fluid, and said damping disk nearly completely spans the cross-sectional area of said working cylinder, with said damping disk having a periphery on which is provided, all the way around, a profiled configuration that seals, in a substantially contact-free manner, said annular gap between said damping disk and said inner wall of said working cylinder, and with said damping disk dividing said working cylinder into two partial chambers that communicate with one another via at least one calibrated transfer passage that opens into each of said partial chambers, said connecting rod is connected to said first connector via an elastic connecting piece.

19. In a hydraulically damped elastic mounting that includes a first connector that bears against a second connector via an essentially annular elastomeric spring element, with a connecting rod being secured to said first connector and extending concentrically into a pot-shaped working cylinder that is securely connected to said second connector and is filled with a hydraulic medium, and with a damping disk being mounted with axial play on a free end of said connecting rod, said damping disk being axially movably disposed in said working cylinder in such a way that said damping disk is disposed essentially perpendicular to the axis of said working cylinder and an annular gap exists between said damping disk and the inner wall of said working cylinder, the improvement wherein:

said working cylinder is filled with the hydraulic medium which is a low-viscosity hydraulic fluid, and said damping disk nearly completely spans the cross-secinal area of said working cylinder, with said damping disk having a periphery on which is provided, all the way around, a profiled configuration that seals, in a substantially contact-free manner, said annular gap between said damping disk and said inner wall of said working cylinder, and with said damping disk dividing said working cylinder into two partial chambers that communicate with one another via at least one calibrated transfer passage that opens into each of said partial chambers, said connecting rod is resiliently bendable transverse to its longitudinal axis.

20. An elastic mounting according to claim 19, in which said transfer passage is formed in said connecting rod.

* * * * *